(12) United States Patent
Hornkvist et al.

(10) Patent No.: US 11,681,718 B2
(45) Date of Patent: Jun. 20, 2023

(54) SCOPING A SYSTEM-WIDE SEARCH TO A USER-SPECIFIED APPLICATION

(71) Applicant: Apple Inc., Cupertino, CA (US)

(72) Inventors: John M. Hornkvist, Cupertino, CA (US); Anubhav Malhotra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 16/688,973

(22) Filed: Nov. 19, 2019

(65) Prior Publication Data
US 2020/0311068 A1 Oct. 1, 2020

Related U.S. Application Data

(60) Provisional application No. 62/826,882, filed on Mar. 29, 2019.

(51) Int. Cl.
| | | |
|---|---|---|
| G06F 16/24 | (2019.01) | |
| G06F 16/25 | (2019.01) | |
| G06F 16/2458 | (2019.01) | |
| G06F 16/248 | (2019.01) | |

(52) U.S. Cl.
CPC ........ G06F 16/2471 (2019.01); G06F 16/248 (2019.01); G06F 16/252 (2019.01)

(58) Field of Classification Search
CPC .. G06F 16/2471; G06F 16/248; G06F 16/252; G06F 16/9035
See application file for complete search history.

(56) References Cited

U.S. PATENT DOCUMENTS

| | | | |
|---|---|---|---|
| 8,204,897 B1 * | 6/2012 | Djabarov | G06F 16/3346 707/767 |
| 8,473,507 B2 | 6/2013 | Loofbourrow et al. | |
| 8,577,417 B2 | 11/2013 | Lessing | |
| 9,582,549 B2 * | 2/2017 | LeBeau | G06F 16/951 |
| 9,589,033 B1 * | 3/2017 | Kuscher | G06F 16/951 |
| 10,222,957 B2 * | 3/2019 | Choi | G06F 40/134 |
| 10,534,783 B1 * | 1/2020 | Raczko | G06F 16/248 |
| 11,170,017 B2 * | 11/2021 | Dessau | G06F 16/90328 |
| 2016/0299977 A1 * | 10/2016 | Hreha | G06F 16/248 |
| 2017/0293685 A1 * | 10/2017 | Miller | G06F 16/93 |
| 2017/0316051 A1 * | 11/2017 | Kitamorn | G06F 16/248 |

* cited by examiner

*Primary Examiner* — Mohsen Almani
(74) *Attorney, Agent, or Firm* — BakerHostetler

(57) ABSTRACT

A device implementing a system for limiting the scope of a search includes a processor configured to, receive, by a first application, first user input including at least a portion of a first search term, and to determine that a second application corresponds to the first search term. The processor is further configured to display a graphical element for activating a search filter that limits search results to content of the second application, and to receive second user input including selection of the graphical element. The processor is further configured to send, to the second application, a search request including at least one of the first search term or a second search term, to receive, from the second application, a completion suggestion or search result based on a search performed on the content of the second application, and to provide the completion suggestion or search result.

21 Claims, 6 Drawing Sheets

SCOPING A SYSTEM-WIDE SEARCH TO A USER-SPECIFIED APPLICATION

CROSS REFERENCE TO RELATED APPLICATIONS

This application claims the benefit of priority to U.S. Provisional Patent Application No. 62/826,882, entitled "Scoping a System-Wide Search to a User-Specified Application," and filed on Mar. 29, 2019, the disclosure of which is hereby incorporated herein in its entirety.

TECHNICAL FIELD

The present description relates generally to searching, including scoping a system-wide search, or an operating system-wide search, to the content of a specified application.

BACKGROUND

An electronic device such as a mobile phone, laptop or a wearable device may include a system-wide search application, and/or a system-wide search process that is part of the device's operating system. The system-wide search application may provide for searching a local index of items and files on the electronic device, including searching for specific word(s) in locally stored files.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
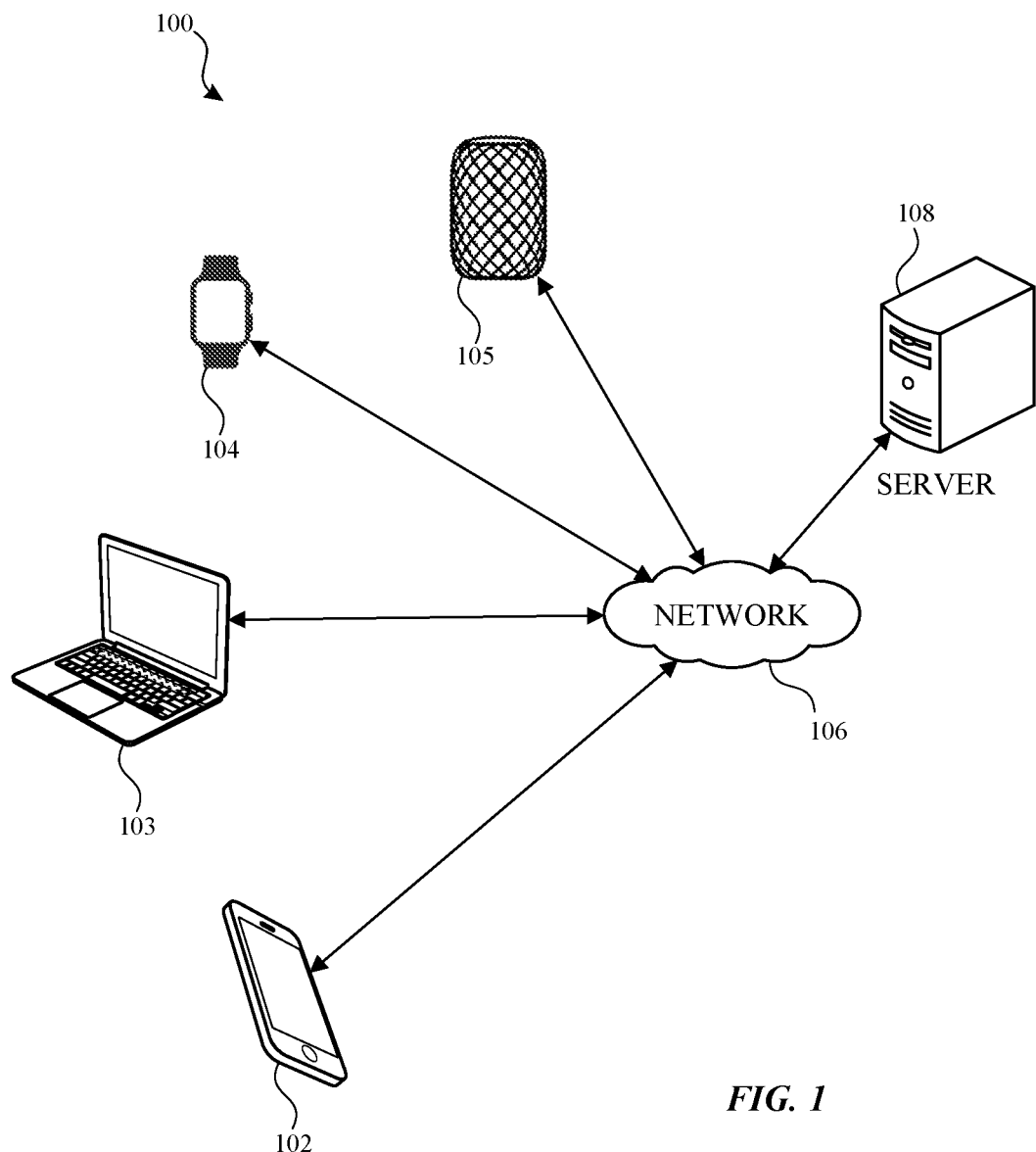
FIG. 1 illustrates an example network environment for limiting the scope of a search to content of an application in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As noted above, an electronic device may include a system-wide search application. For example, the system-wide search application may be implemented as part of the operating system running on the electronic device and/or may be a process of the operating system running on the device. The system-wide search application may provide for searching a local index of items/content and files on the electronic device. For example, the system-wide search application may allow the user to search for and locate a wide variety of items on the electronic device (e.g., locally-stored items), including documents, pictures, music, applications, and system preferences. The system-wide search may further allow the user to search for web-based content, for example, as accessed by a browser or other application(s) installed on the device. The system-wide search application may provide for searching specific words in the locally stored content and/or the web-based content.

In some cases, a user of the electronic device may wish to limit the scope of a system-wide search to search results provided by a specified application. For example, the user may wish to limit search results to those provided by a social networking application installed on the device.

The subject system provides for limiting the scope of a search in this manner. For example, a system-wide search application receives user input including a search term or part of a search term. The search term may correspond to the name of an application installed on the electronic device (e.g., the name of a social networking application), or may be a term that appears in the content of that application (e.g., the search term "lunch" may appear within the messaging content of a social networking application). The system-wide search application determines that the other application corresponds to the search term and displays a graphical element (e.g., an icon representing the other application) for activating a search filter that limits search results to content of the other application.

The user may select the graphical element, and the system-wide search application may send a search request to the other application, e.g., instead of only searching for content/items indexed for the system-wide search application. In a case where the search term corresponds to the name of the other application (e.g., the name of a social networking application), the user may enter an additional search term which is sent to the other application as the search request. In a case where the search term corresponds to content appearing in the other application (e.g., the term "lunch"), the search term itself is sent to the other application as the search request.

The system-wide search application receives, from the other application, completion suggestion(s) and/or search result(s) based on a search performed by the other application using the search term or partial search term, such as by searching the application's content. The system-wide search application provides (e.g., for display) the completion suggestion(s) and/or search result(s).

FIG. 1 illustrates an example network environment for limiting the scope of a search to content of an application in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104 and 105 (hereinafter 102-105), a network 106 and a server 108. The network 106 may communicatively (directly or indirectly) couple, for example, any two or more of the electronic devices 102-105 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-105 and a single server 108; however, the network environment 100 may include any number of electronic devices and any number of servers.

One or more of the electronic devices 102-105 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a laptop computer, the electronic device 104 is depicted as a smartwatch, and the electronic device 105 is depicted as a smart speaker.

An application (e.g., a system-wide search application and/or process) running on the electronic device 102-105 may provide for searching a local system-wide index of items and/or files, as well as web-based content (e.g., as provided by a browser or other application(s) installed on the device). Moreover, the electronic devices 102-105 may be configured to communicate or otherwise interact with the server 108. For example, the system-wide search application running on one or more of the electronic devices 102-105 may be configured to send a search query to the server 108, and to receive completion suggestion(s) and/or search result(s) from the server 108 in response to the search query.

In one or more implementations, the server 108 may correspond to a remote service that stores content corresponding to an application installed on one or more of the electronic devices 102-105. Thus, in response to the search query from the application, the server 108 may provide completion suggestion(s) and/or search result(s) from the content of the remote service. Each of the electronic devices 102-105 may be, and/or may include all or part of, the device discussed below with respect to FIG. 2, and/or the electronic system discussed below with respect to FIG. 7.

The server 108 may be, and/or may include all or part of the electronic system discussed below with respect to FIG. 7. The server 108 may include one or more servers, such as a cloud of servers, that may be used to provide messages and/or rules for displaying the messages to one of more of the electronic devices 102-105. For explanatory purposes, a single server 108 is shown and discussed with respect to various operations. However, these and other operations discussed herein may be performed by one or more servers, and each different operation may be performed by the same or different servers.

Figure 2:
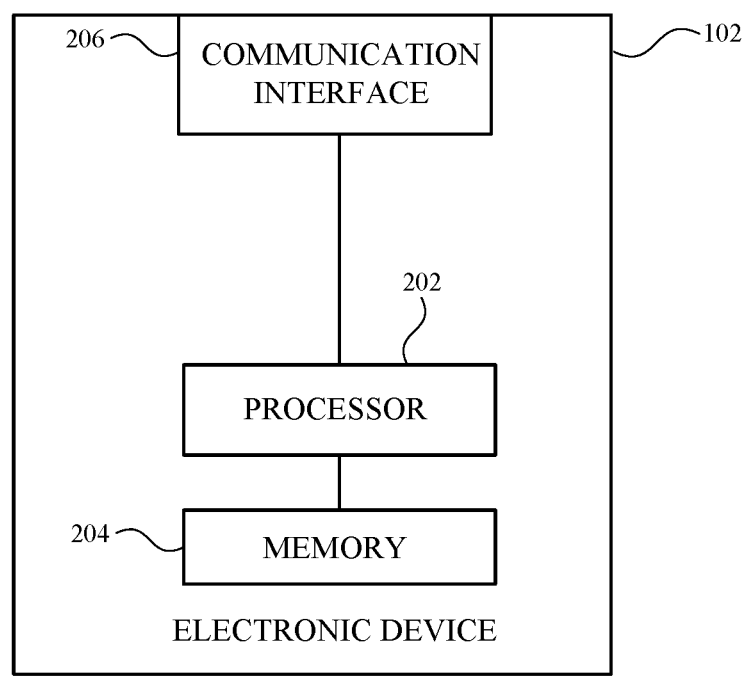
FIG. 2 illustrates an example device that may implement a system for limiting the scope of a search to content of an application in accordance with one or more implementations.

FIG. 2 illustrates an example device that may implement a system for limiting the scope of a search to content of an application in accordance with one or more implementations. For explanatory purposes, FIG. 2 is primarily described herein with reference to the electronic device 102. However, FIG. 2 may correspond to any of the electronic devices 102-105 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and a communication interface 206. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store code corresponding to one or more applications. For example, the memory 204 may store code corresponding to a system-wide search application and/or process, which may be implemented as part of an operating system of the electronic device 102. In addition, the memory 204 may store code corresponding to other applications. One or more of these other applications may store content in the memory 204 where the content is indexed by each respective other application, such that terms appearing in the content are searchable with respect to that application.

The communication interface 206 may include suitable logic, circuitry, and/or code that enables wired or wireless communication, such as between any of the electronic devices 102-105 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
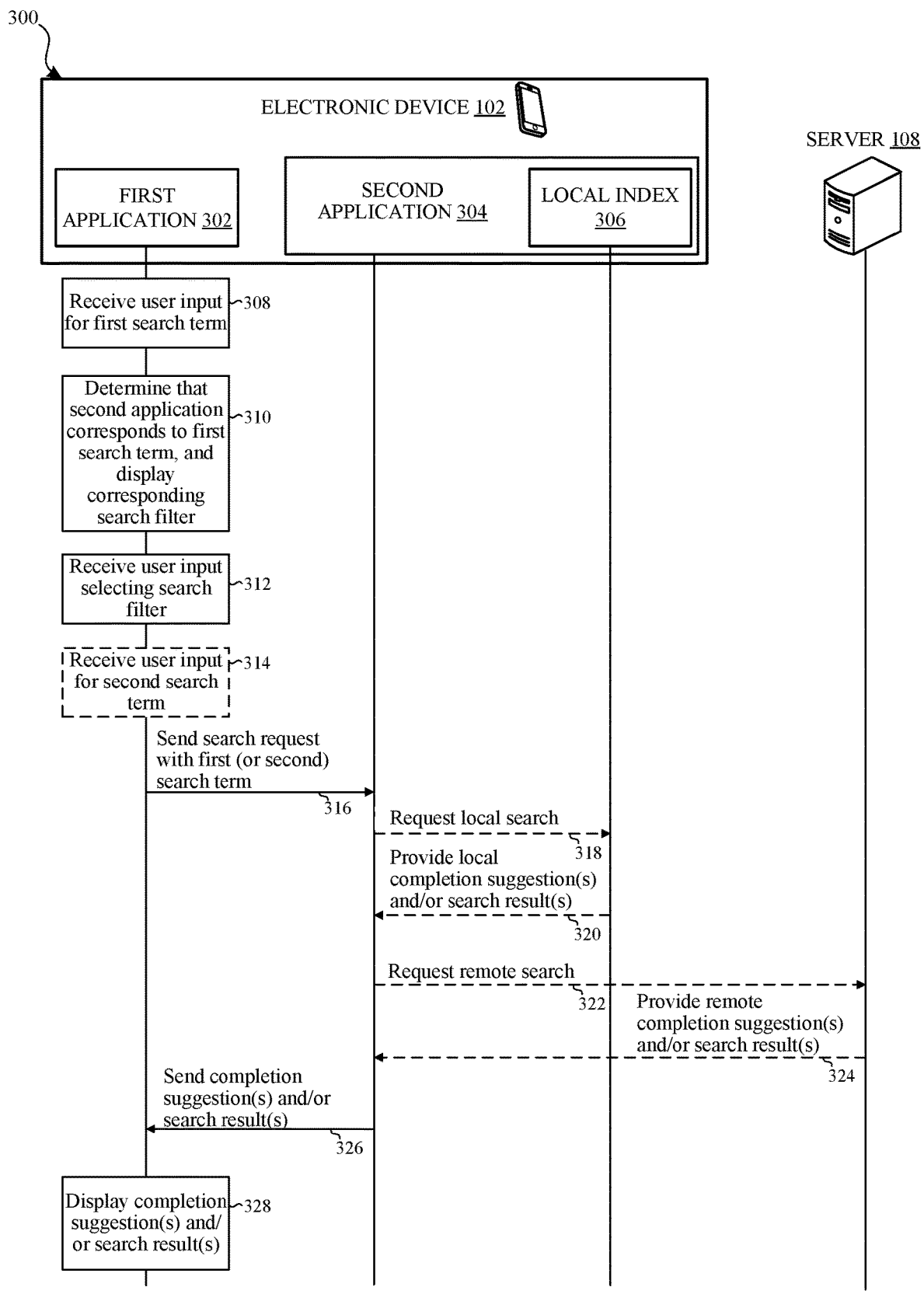
FIG. 3 illustrates an example process for limiting the scope of a search to content of an application in accordance with one or more implementations.

FIG. 3 illustrates an example process for limiting the scope of a search to content of an application in accordance with one or more implementations. For explanatory purposes, the process 300 is primarily described herein with reference to the electronic device 102 and the server 108 of FIG. 1. However, the process 300 is not limited to the electronic device 102 and the servers 108 of FIG. 1, and one or more blocks (or operations) of the process 300 may be performed by one or more other components and/or other suitable devices (e.g., any of the electronic devices 102-105). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As noted above, the operating system of the electronic device 102 may implement a system-wide search application (e.g., the first application 302). The first application 302 may provide for searching a local system-wide index of items and/or files (e.g., documents, messages, images, music, applications, system preferences, and the like) on the electronic device 102, as well as web-based content (e.g., as accessed by a browser or other application(s) installed on the device). The first application 302 may provide for searching specific words in the locally-stored items/files and/or the web-based content.

In one or more implementations, the first application 302 may provide for sending a search query to a second application 304 (e.g., selected by the user as discussed below), so as to limit the scope of a search to search results provided by the second application 304. The second application 304 may be implemented as part of the operating system of the electronic device 102, or may correspond to a third party application (e.g., installed on the electronic device 102) that is not included with the operating system. Examples of the second application 304 may include, but are not limited to applications for books, business, catalogs, communication, education, entertainment, finance, food & drink, games, health & fitness, lifestyle, medical, music, navigation, news, photo & video, productivity, reference, social networking, sports, travel, utilities and weather (e.g., in one or more geographical regions).

Figure 4:
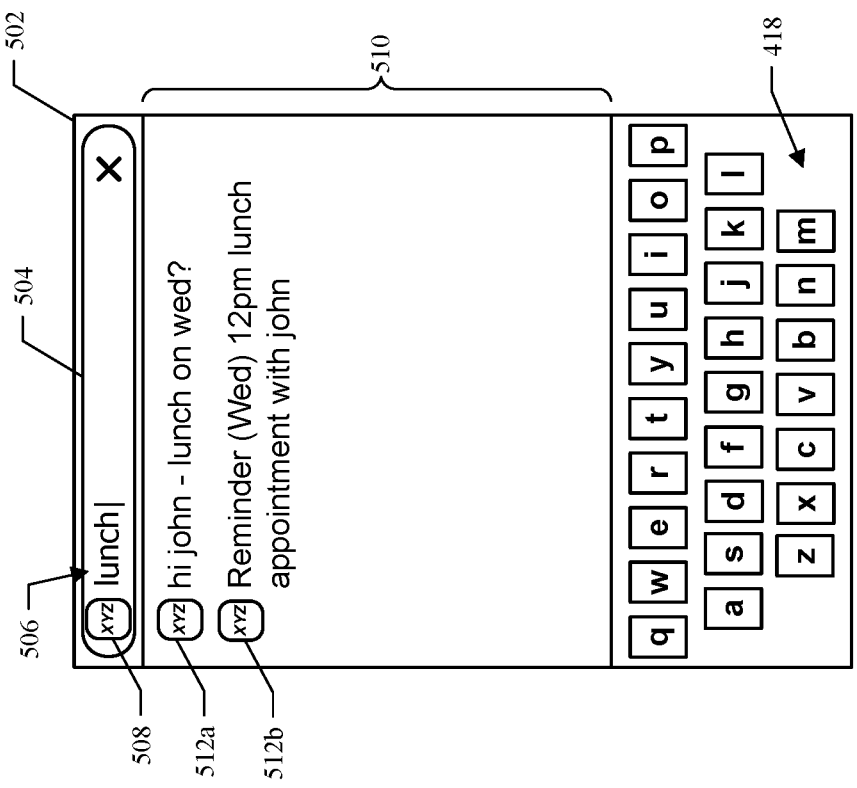
FIG. 4 illustrates an example user interface for performing a system-wide search in accordance with one or more implementations.

At operation 308, the first application 302 receives user input of a first search term. FIG. 4 illustrates an example user interface 402 by which a user may input the first search term. The user interface 402 may include a search input interface 404 configured to receive user input (e.g., via a virtual keyboard 418) for the first search term 406.

As illustrated in FIG. 4, the search input interface 404 may include a graphical element 408 (e.g., illustrated as a magnifying glass) to indicate that suggestions based on the first search term 406 are system-wide suggestions (e.g., based on searching locally indexed terms and/or web-based content associated with applications installed on the device). In this regard, the suggestion interface 410 may provide suggestions to the user, based on the entry (or partial entry) of the first search term 406 within search input interface 404. These suggestions can include, but are not limited to, suggested search terms 412a-412c, suggested filters 414a-414b and/or suggested applications 416a-416b.

The suggested search terms 412a-412c of the suggestion interface 410 may correspond to local items/files and/or web-based content (e.g., including names of the items, files or web-based content, or specific words appearing within the local items, files or web-based content). In the example of FIG. 4, the suggested search terms 412a-412c are illustrated with a magnifying glass graphical element to indicate that user selection of one of the suggested search terms 412a-412c would result in performing a system-wide search based on the selected term (e.g., as opposed to launching an application as discussed below with respect to elements 416a-416b, or as opposed limiting search scope to a selected application as discussed below with respect to suggested filters 414a-414b). The suggested search terms 412a-412c may be determined based on performing an index-based (e.g., local) query on the first search term 406 and/or a web-based query (e.g., by one or more applications such as the first application 302 and/or the second application 304) on the first search term 406. In response to user input selecting one of the suggested search terms 412a-412c, the first application 302 may provide for performing a system-wide search on the selected search term and returning corresponding local and/or web-based search results.

In addition, the suggested applications 416a-416b of the suggestion interface 410 may correspond to applications that are installed on the electronic device 102. In the example of FIG. 4, the suggested applications 416a-416b are illustrated within an "Applications" grouping, to indicate that selecting one of the suggested applications 416a-416b would result in launching (or bringing to the foreground, if already launched) the selected application. The suggested applications 416a-416b may be determined based on performing an index-based (e.g., local) query on the first search term 406 using the names of and/or the content within the applications installed on the electronic device. In response to user input selecting one of the suggested applications 416a-416b, the first application 302 may provide for launching, or otherwise bringing to the foreground, the selected application.

Moreover, to limit the scope of a search to search results provided by a particular application (e.g., the second application 304), the suggestion interface 410 may provide the suggested filters 414a-414b. In the example of FIG. 4, the suggested filters 414a-414b are illustrated with a respective application graphical element (e.g., icon) to indicate that selection of one of the suggested filters 414a-414b would result in performing a search with scope that is limited to the search results provided by the selected application (e.g., the second application 304). Each application may have a different graphical element (e.g., icon) that visually represents the respective application. In one or more implementations, the graphical element for suggested filter 414a may be similar to the graphical element for the suggested application 416a, and the graphical element for the suggested filter 414b may be similar to the graphical element for the suggested application 416b.

The suggested filters 414a-414b may be determined based on performing an index-based (e.g., local) query on the first search term 406 using the names of and/or content within the applications installed on the electronic device. Thus, with reference to operation 310 of FIG. 3, the first application 302 determines that the second application 304 corresponds to the first search term 406, and displays an graphical element (e.g., icon) corresponding to a search filter (e.g., for limiting the scope of a search to content of the second application 304).

At operation 312, the first application 302 receives user input selecting the icon (e.g., the suggested filter 414a of FIG. 4). In response to the user input selecting the suggested filter 414a, the first application 302 may display the user interface 502 of FIG. 5. The user interface 502 corresponds to a search with a scope confined to content associated with the selected/specified second application 304. The search query may correspond to the search term initially entered by the user (e.g., the first search term 406). Alternatively, the search query may correspond to a second search term subsequently entered by the user (e.g., the second search term 506).

Figure 5:
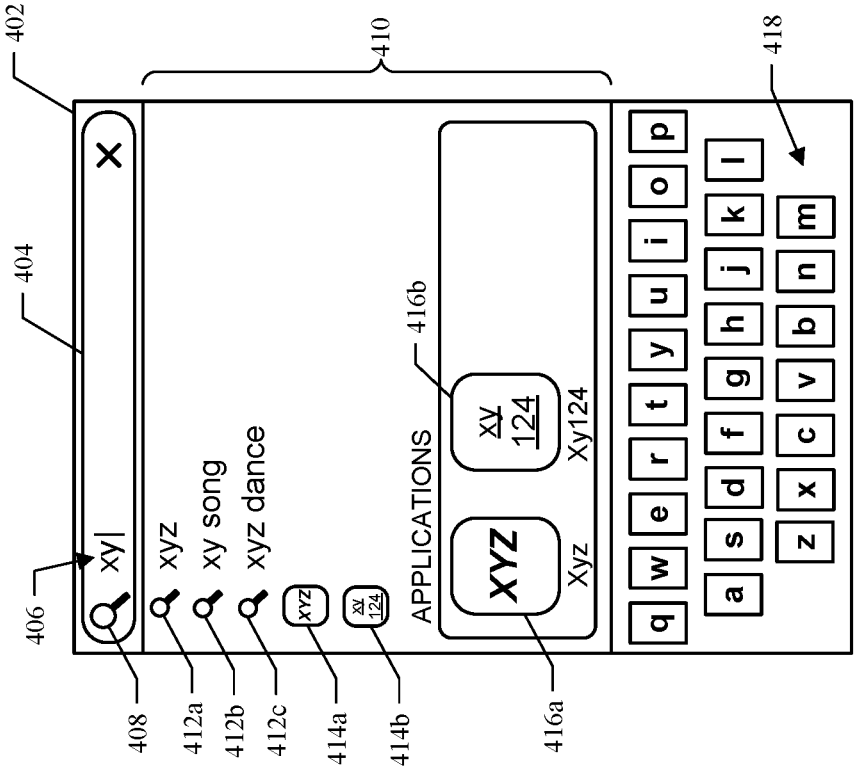
FIG. 5 illustrates an example user interface in which the scope of a search is limited to content of a selected application in accordance with one or more implementations.

FIGS. 4-5 illustrate the example in which the user enters the first search term 406 and subsequently enters the second search term 506. For example, the first search term 406 (e.g., "xy") may match or be a prefix for the application names corresponding to the suggested filters 414a-414b and/or the suggested applications 416a-416b (e.g., application names "XYZ" and "xy124"). After selecting the suggested filter 414a within the user interface 402, the user may subsequently enter a second search term (e.g., the search term 506 of "lunch"). Thus, with reference to operation 314 of FIG. 3 (e.g., which is depicted as hyphenated to indicate an optional operation), the first application 302 receives the user input for the second search term 506 (e.g., "lunch').

Alternatively, it is possible that the user may initially input the term "lunch" with respect to the search input interface 404 of the user interface 402 (e.g., without initially inputting the first search term 406 of "xy"). For example, the term "lunch" may appear in the content of the second application 304 (e.g., within messages and/or other content associated with the second application 304). For example, the second application 304 may maintain an index (e.g., the local index 306) of searchable terms that appear within some or all of the content (e.g., messages, calendar entries, data records, and the like) of the second application 304, and the term "lunch" may appear within the searchable index. Based on the appearance of the term "lunch" within the content of the second application 304 (e.g., or based on the term appearing a predefined number of times within the content), the suggested filter 414a (e.g., corresponding to application "XYZ") may be determined to be displayed within the suggestion interface 410 of user interface 402. The user may select the suggested filter 414a. In response to the user selection, the user interface 502 may be displayed (e.g., and prefilled with the term "lunch").

The search input interface 504 may include an icon 508 (e.g., corresponding to the selected filter 414a). The icon 508 may indicate that suggestions (e.g., completion suggestions and/or search results) are limited to those provided by the second application 304 (e.g., corresponding to the suggested filter 414a). In the example of FIG. 5, the corresponding suggestions would be limited to content of the second application 304 based on the term "lunch." Thus, at operation 316, the first application 302 sends a search request to the second application 304, which is configured to perform a search, e.g., of its own content, based on the term "lunch."

Operations 318-324 illustrate different manners in which the second application 304 may obtain search results based on the search term. In particular, the second application 304 may be configured to provide search results based on content which is locally stored and/or which is associated with the second application 304. Alternatively or in addition, the second application 304 may be configured to provide search results based on content which is obtained from a remote service (e.g., from the server 108) and which is associated with the second application 304.

With respect to searching local content, as noted above, the second application 304 may maintain an index (e.g., the local index 306) of searchable terms that appear within content (e.g., messages, calendar entries, data records, and other items corresponding to the second application 304) locally stored on the electronic device 102. Thus, in response to the search query from operation 316, the second application 304 may perform a local search based on the search term (e.g., "lunch") included with the search query (operation 318). For example, the second application 304 may query the local index 306. At operation 320, the local index 306 may provide the second application 304 with local completion suggestion(s) and/or search result(s).

With respect to searching remote content, as noted above, the server 108 may correspond to a remote service which stores content corresponding to the second application 304. The content may differ from and/or exceed the content that is stored (and indexed) locally on the electronic device 102. Thus, at operation 322, the second application 304 sends, to the server 108, a request for a remote search based on the search term (e.g., "lunch"). For example, the second application 304 may send a search query to the server 108, where the search query includes the search term. At operation 324, the server 108 may provide the second application 304 with the remote completion suggestion(s) and/or search result(s).

The operations 318-324 are illustrated as hyphenated in FIG. 3, for example, to indicate optional operations. For example, the second application 304 may be configured to perform one of a local search (e.g., corresponding to operations 318-320), a remote search (e.g., corresponding to operations 322-324), or both a local and a remote search (e.g., corresponding to operations 318-324). Moreover, the second application 304 may be configured to filter the local and/or remote completion suggestion(s) and/or search result(s) based on predefined rules. For example, the predefined rules may specify one or more of: a total number of completion suggestion(s) and/or search result(s) to provide to the first application 302, a number of times the search term (e.g., "lunch") appears within content corresponding to the completion suggestion(s) or search result(s) and/or other rules.

Thus, at operation 326, the second application 304 returns the local and/or remote completion suggestion(s) and/or search result(s) to the first application 302. At operation 328, the first application 302 provides the completion suggestion(s) and/or search result(s) for display. In the example of FIG. 5, the suggestion interface 510 may provide search results 512a-512b to the user, where the search results 512a-512b are limited to content of the second application 304. Upon user selection of one of the search results 512a-512b, the user may be directed to the corresponding content (e.g., a message thread, email thread, calendar entry data record entry, or the like) of the second application 304.

In one or more implementations, applications may be associated with genres, and/or application types. For example, the applications may be associated with a genre by an on-line store and/or by a service provider that provides the applications. Thus, if in FIG. 4 the user inputted the name of a genre or an application type, e.g. "social," the suggestion interface 410 may display suggested application genres or types, e.g., instead of and/or in addition to suggested applications 416a-b. When the user selects a suggested application genre/type in FIG. 4, then the search results in FIG. 5 may be limited to items from applications that are in the selected application genre/type. For example, if the user input "lunch" in FIG. 5, the search results may include "communications," "recommendations," and the like.

Figure 6:
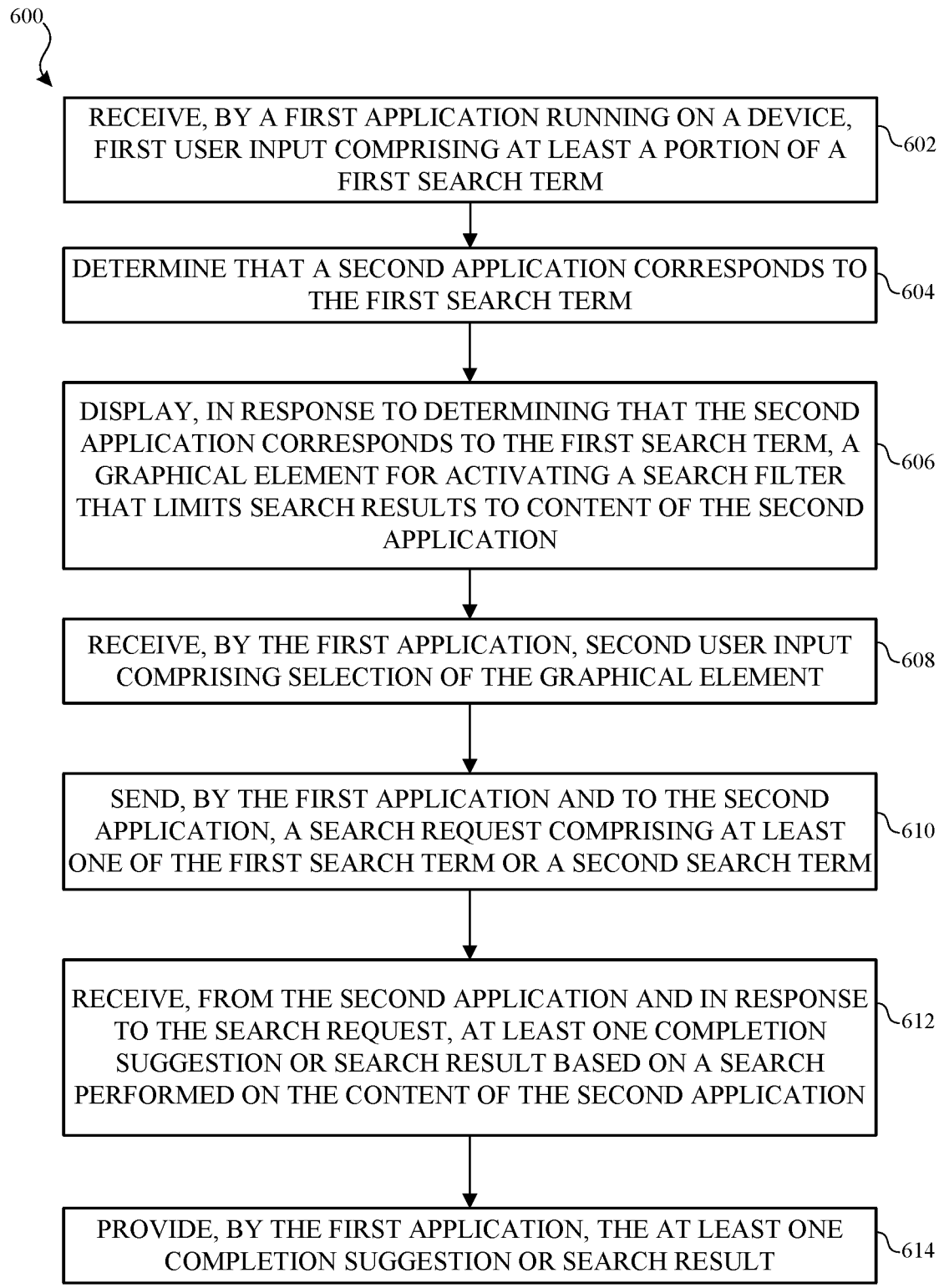
FIG. 6 illustrates a flow diagram of an example process for limiting the scope of a search to content of an application in accordance with one or more implementations.

FIG. 6 illustrates a flow diagram of an example process for limiting the scope of a search to content of an application in accordance with one or more implementations. For explanatory purposes, the process 600 is primarily described herein with reference to the electronic device 102 and the server 108 of FIG. 1. However, the process 600 is not limited to the electronic device 102 and the server 108 of FIG. 1, and one or more blocks (or operations) of the process 600 may be performed by one or more other components of the server 108 and other suitable devices (e.g., any of the electronic devices 102-106). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The electronic device 102 receives, by a first application running on the electronic device 102, first user input comprising at least a portion of a first search term (602). The electronic device 102 determines that a second application corresponds to the first search term (604). Determining that the second application corresponds to the first search term may include determining that the first search term appears a threshold number of times within the content of the second application (e.g., in conjunction with an index-based search). The electronic device 102 displays, in response to determining that the second application corresponds to the first search term, a graphical element for activating a search filter that limits search results to content of the second application (606).

The electronic device 102 receives, by the first application, second user input comprising selection of the graphical element (608). The electronic device 102 sends, by the first application and to the second application, a search request comprising at least one of the first search term or a second search term (610).

The electronic device 102 may further receive third user input including the second search term. The first search term may correspond to a name of the second application, and the sending may include sending the second search term to the second application, for performing the search based on the second search term. Alternatively, the first search term may be included in the content of the second application (e.g., within messages and/or other content associated with the second application), and the sending may include sending the first search term to the second application, for performing the search based on the first search term.

The electronic device 102 receives, from the second application and in response to the search request, at least one completion suggestion or search result based on a search performed on the content of the second application (612). The electronic device 102 provides, by the first application, the at least one completion suggestion or search result (614).

At least part of the content of the second application may be locally stored on the electronic device 102. The at least one completion suggestion or search result may be obtained from the locally-stored content of the second application. Alternatively or in addition, at least part of the content of the second application may be remote from the electronic device 102. The at least one completion suggestion or search result may be obtained from a remote service (e.g., the server 108) corresponding to the second application.

As described above, one aspect of the present technology is the gathering and use of data available from specific and legitimate sources for limiting the scope of a search. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for limiting the scope of a search. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of limiting the scope of a search, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 7:
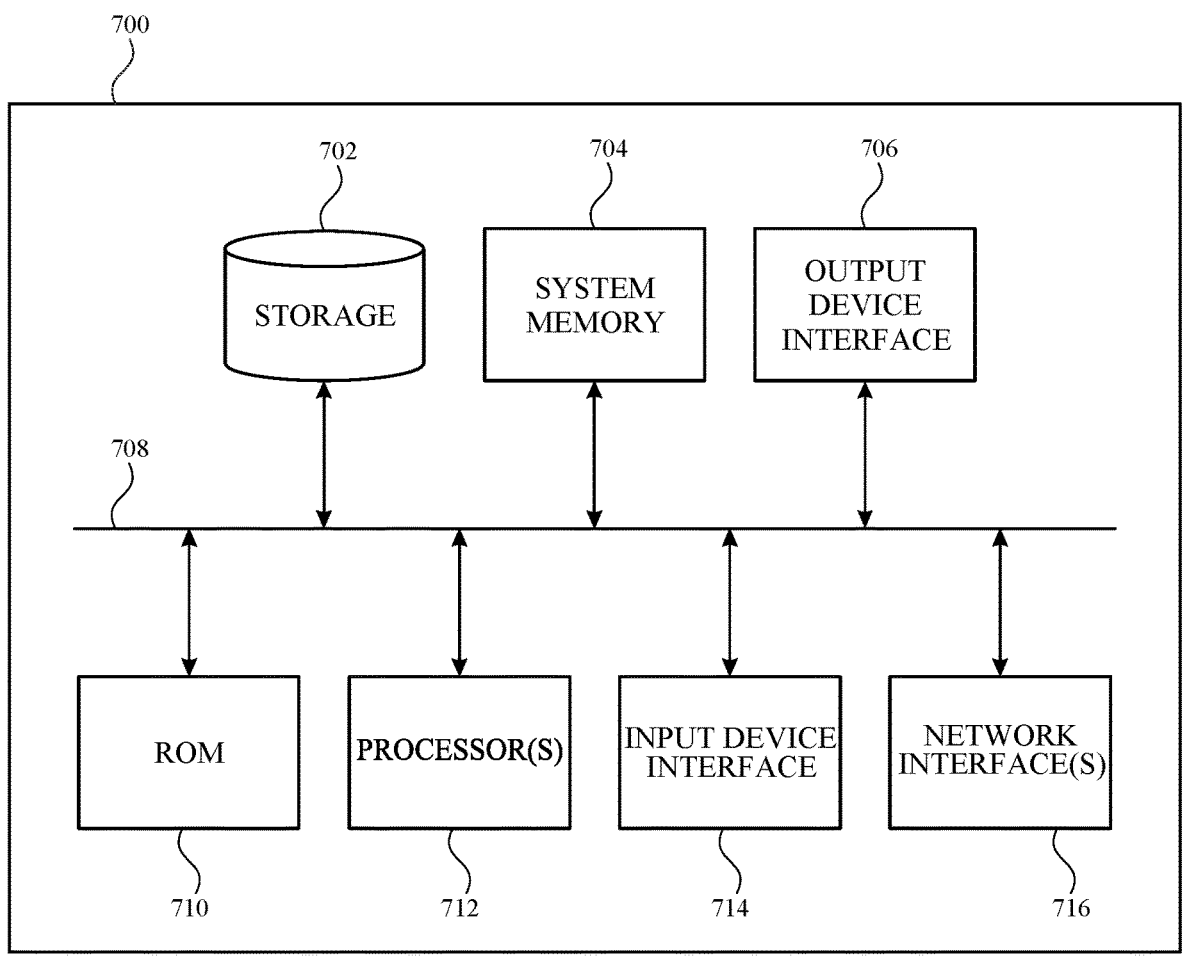
FIG. 7 illustrates an example electronic system with which aspects of the subject technology may be implemented in accordance with one or more implementations.

FIG. 7 illustrates an electronic system 700 with which one or more implementations of the subject technology may be implemented. The electronic system 700 can be, and/or can be a part of, one or more of the electronic devices 102-105, and/or one or the server 108 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes, such as the server 108 shown in FIG. 1, through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    receiving, by a first application running on a device, first user input comprising at least a portion of a first search term;
    searching a local system-wide index corresponding to a plurality of applications installed on the device to determine that the at least the portion of the first search term is included in content of a second application of the plurality of applications, wherein the local system-wide index comprises a plurality of content items from the plurality of applications that were indexed by the first application;
    displaying, in response to determining that the at least the portion of the first search term is included in the content of the second application from the search of the local system-wide index, a graphical element for activating a search filter that limits search results to the content of the second application;
    receiving, by the first application, second user input comprising selection of the graphical element;
    responsive to receiving the selection of the graphical element, sending, by the first application and to the second application, a search request comprising the at least the portion of the first search term;
    receiving, from the second application and in response to the search request, at least one completion suggestion or search result based on a search performed on the content of the second application using the at least the portion of the first search term, wherein the second application is configured to search another index comprising content indexed by the second application to obtain the at least one completion suggestion or search result, the other index being separate and distinct from the local system-wide index; and
    providing the at least one completion suggestion or search result.

2. The method of claim 1, wherein at least part of the content of the second application is locally stored on the device.

3. The method of claim 2, wherein the at least one completion suggestion or search result is obtained from the locally-stored content of the second application.

4. The method of claim 1, wherein at least part of the content of the second application is remote from the device.

5. The method of claim 4, wherein the at least one completion suggestion or search result is obtained from a remote service corresponding to the second application.

6. The method of claim 1, further comprising:
    receiving third user input comprising a second search term,
    wherein the first search term does not correspond to a name of the second application, and
    wherein the sending comprises sending the second search term to the second application, for performing the search based on the second search term.

7. The method of claim 1, wherein the sending further comprises sending the first search term to the second application, for performing the search further based on the first search term.

8. The method of claim 7, wherein determining that the at least the portion of the first search term is included in the content of the second application comprises determining that the first search term appears a threshold number of times within the content of the second application.

9. A device, comprising:
    at least one processor; and
    a memory including instructions that, when executed by the at least one processor, cause the at least one processor to:
        receive, by a first application running on the device, first user input comprising at least a portion of a first search term;
        search a local system-wide index corresponding to a plurality of applications installed on the device to determine that the at least the portion of the first search term is included in content of a second application of the plurality of applications, wherein the local system-wide index comprises a plurality of content items from the plurality of applications that were indexed by the first application;
        display, in response to determining that the at least the portion of the first search term is included in the content of the second application from the search of the local system-wide index, a graphical element for activating a search filter that limits search results to the content of the second application;
        receive, by the first application, second user input comprising selection of the graphical element;
        send, by the first application and to the second application, a search request comprising the at least the portion of the first search term;
        receive, from the second application and in response to the search request, at least one completion suggestion or search result based on a search performed on the content of the second application, wherein the second application is configured to search another index comprising content indexed by the second application to obtain the at least one completion suggestion or search result, the other index being separate and distinct from the local system-wide index; and
        provide the at least one completion suggestion or search result.

10. The device of claim 9, wherein at least part of the content of the second application is locally stored on the device.

11. The device of claim 10, wherein the at least one completion suggestion or search result is obtained from the locally-stored content of the second application.

12. The device of claim 9, wherein at least part of the content of the second application is remote from the device.

13. The device of claim 12, wherein the at least one completion suggestion or search result is obtained from a remote service corresponding to the second application.

14. The device of claim 9, wherein the instructions further cause the at least one processor to:
    receive third user input comprising a second search term,
    wherein the first search term does not correspond to a name of the second application, and
    wherein the sending comprises sending the second search term to the second application, for performing the search based on the second search term.

15. The device of claim 9, wherein the sending comprises sending the first search term to the second application, for performing the search based on the first search term.

16. The device of claim 15, wherein determining that the at least the portion of the first search term is included in the content of the second application comprises determining that the first search term appears a threshold number of times within the content of the second application.

17. A computer program product comprising code, stored in a non-transitory computer-readable storage medium, the code comprising:

code to receive, by a first application running on a device, first user input within a search input field, the first user input comprising at least a portion of a first search term;

code to search a local system-wide index corresponding to a plurality of applications installed on the device to determine that the at least the portion of the first search term is included in content of a second application of the plurality of applications, wherein the local system-wide index comprises a plurality of content items from the plurality of applications that were indexed by the first application;

code to display, in response to determining that the at least the portion of the first search term is included in the content of the second application from the search of the local system-wide index, a graphical element for activating a search filter that limits search results to the content of the second application;

code to receive, by the first application, second user input comprising selection of the graphical element;

code to send, in response to receiving the second user input, a search request to the second application, the search request comprising the at least the portion of the first search term;

code to receive, from the second application and in response to the search request, at least one completion suggestion or search result based on a search performed on the content of the second application, wherein the second application is configured to search another index comprising content indexed by the second application to obtain the at least one completion suggestion or search result, the other index being separate and distinct from the local system-wide index; and code to provide, by the first application, the at least one completion suggestion or search result.

18. The computer program product of claim 17, the code further comprising:

code to receive third user input comprising a second search term, wherein the first search term does not correspond to a name of the second application, and wherein the sending comprises sending the second search term to the second application, for performing the search based on the second search term.

19. The computer program product of claim 17, wherein the sending comprises sending the first search term to the second application, for performing the search based on the first search term.

20. The computer program product of claim 19, wherein determining that the at least the portion of the first search term is included in the content of the second application comprises determining that the first search term appears a threshold number of times within the content of the second application.

21. The method of claim 1, wherein the at least one completion suggestion or search result is obtained from a remote service corresponding to the second application.

* * * * *